United States Patent
Krupp (10) Patent No.: US 9,628,743 B2
(45) Date of Patent: Apr. 18, 2017

(54) METHOD AND DEVICE FOR DATA PROCESSING, AND SYSTEM COMPRISING THE DEVICE

(75) Inventor: Johannes Krupp, Bad Aibling (DE)

(73) Assignee: Nokia Siemens Networks OY, Espoo (FI)

(*) Notice: Subject to any disclaimer, the term of this patent is extended or adjusted under 35 U.S.C. 154(b) by 1828 days.

(21) Appl. No.: 12/635,142

(22) Filed: Dec. 10, 2009

(65) Prior Publication Data

US 2010/0146571 A1 Jun. 10, 2010

(30) Foreign Application Priority Data

Dec. 10, 2008 (EP) ..................... 08171233

(51) Int. Cl.
| | |
|---|---|
| H04N 7/173 | (2011.01) |
| H04N 5/445 | (2011.01) |
| H04N 21/262 | (2011.01) |
| H04N 21/414 | (2011.01) |
| H04N 21/426 | (2011.01) |
| H04N 21/435 | (2011.01) |
| H04N 21/472 | (2011.01) |
| H04N 21/488 | (2011.01) |
| H04N 21/643 | (2011.01) |
| H04N 21/84 | (2011.01) |

(52) U.S. Cl.
CPC ....... *H04N 5/445* (2013.01); *H04N 21/26283* (2013.01); *H04N 21/41407* (2013.01); *H04N 21/42684* (2013.01); *H04N 21/435* (2013.01); *H04N 21/47214* (2013.01); *H04N 21/4882* (2013.01); *H04N 21/64322* (2013.01); *H04N 21/84* (2013.01)

(58) Field of Classification Search
CPC ....... H04N 21/26283; H04N 21/41407; H04N 21/42684; H04N 21/435
USPC ..................... 725/47, 48, 134, 109
See application file for complete search history.

(56) References Cited

U.S. PATENT DOCUMENTS

| | | | |
|---|---|---|---|
| 2008/0127257 A1* | 5/2008 | Kvache ........................ | 725/39 |
| 2008/0139193 A1 | 6/2008 | Hao et al. | |
| 2008/0155607 A1 | 6/2008 | Klappert | |
| 2009/0220216 A1* | 9/2009 | Marsh et al. ................ | 386/124 |
| 2009/0293088 A1* | 11/2009 | Mukerji et al. ............... | 725/47 |

* cited by examiner

*Primary Examiner* — Jivka Rabovianski
(74) *Attorney, Agent, or Firm* — Laurence A. Greenberg; Werner H. Stemer; Ralph E. Locher (57) ABSTRACT

A data processing method has a first system provide first program information and the first program information is also provided for at least one first terminal. Second program information is determined on the basis of the first program information, the second program information is provided for a second system. The second system has at least one function for providing the second program information for at least one second terminal. Furthermore, a device is provided for performing the method and a system with such a device.

15 Claims, 5 Drawing Sheets

METHOD AND DEVICE FOR DATA PROCESSING, AND SYSTEM COMPRISING THE DEVICE

CROSS-REFERENCE TO RELATED APPLICATION

This application claims the priority, under 35 U.S.C. §119, of European patent application EP 08171233, filed Dec. 10, 2008, which is herewith incorporated by reference in its entirety.

BACKGROUND OF THE INVENTION

Field of the Invention

The invention relates to a method and a device for data processing, and a system comprising the device.

Television and radio programs are increasingly being offered via a plurality of distribution routes. Thus, such program ranges are provided via terrestrial antenna signals, but also via cable networks, satellite systems, Internet and communication networks, such as mobile radio networks, in particular. More generally, multimedia services are supported via these new distribution routes; said multimedia services can comprise, in addition to television and audio programs, for example also video on demand, audio on demand, games, texts, images, data and Internet access.

Thus, with IPTV (Internet Protocol Television), for example, broadband applications such as television programs and films are transmitted digitally via a digital data network. The Internet Protocol (IP), which also underlies the Internet, is used for this purpose. In the case of IPTV, a telecommunications provider typically makes available to a specific user base, the subscribers, a fixed program range with defined quality via a broadband network. IPTV generally requires, for technical reasons, the subscriber to have a suitable terminal approved by the IPTV provider. The terminal receives data streams via an Internet link, e.g. a DSL-based link, divides these data streams into partial streams (audio, video, data, etc.), decodes them and generally supplies a picture and audio signal to an integrated or external video-audio output unit. In particular, for example set-top boxes (STB), television sets (TV), personal computers (PC) and mobile radio devices are available as terminals. For providing the multimedia services relating to a respective IPTV range, components for control, load distribution and access control, for feeding television programs (TV headend) into the broadband network, for providing video/audio contents on demand (VoD server), for recording contents (PVRs), for transmission by streaming and/or download, and also for encrypting the contents to be transmitted, are present, inter alia, on the part of the provider.

For simple handling of the program range, program information in the form of an electronic program guide (EPG) is available to the subscriber. This program information is made available to the subscriber with a content, e.g. in the context of the transmission of a DVD signal, or separately from the transmission of a content.

In addition to IPTV network solutions based on a fixed network, there are network solutions for mobile television which are suitable in particular for mobile radio networks and which are typically offered by mobile radio network providers, for example. Such solutions require at the provider end similar components to those already mentioned above, but use different concepts and standards owing to different technology. In particular, for example the coding of the useful signals (e.g. UMTS, MBMS, DVB-H) and the functionality of the terminals (e.g. display size, local processing power, local memory, transmission bandwidth) are different from the IPTV solutions used for a fixed network.

It is disadvantageous in this case that the program information is not automatically consistent across a plurality of different network solutions.

SUMMARY OF THE INVENTION

It is accordingly an object of the invention to provide a method and a data processing device, as well as a system with the device, which overcome the above-mentioned disadvantages of the heretofore-known devices and methods of this general type and which, in particular, ensuring that the availability of consistent program information for the subscribers across a plurality of systems for providing program information is achieved efficiently and reliably.

With the foregoing and other objects in view there is provided, in accordance with the invention, a data processing method, which comprises:
  providing first program information with a first system;
  providing the first program information also for at least one first terminal;
  determining second program information on a basis of the first program information;
  providing the second program information for a second system; and
  providing, with a function of the second system, the second program information for at least one second terminal.

In other words, the objects of the invention are achieved with a method for data processing:
  wherein a first system provides first program information,
  wherein the first program information is also provided for at least one first terminal,
  wherein a second program information is determined on the basis of the first program information,
  wherein the second program information is provided for a second system,
  wherein the second system has at least one function for providing the second program information for at least one second terminal.

In this case, it is advantageous that the second program information can be determined from the first program information automatically without involvement of an operator, whereby consistency of both items of program information is provided and there is a reduction in the probability of errors as a result of the omission of operator actions.

Moreover, the provision of the second program information determined to the second system can be effected automatically, said second system having at least one function for providing the second program information determined for a second terminal. This affords the advantage that there is no need for operator intervention for providing the second program information for a second system for providing the second program information.

Finally, near-instantaneous provision of the second program information is made possible since the determination and provision of the second program information only presupposes the provision or availability of the first program information and can directly follow the latter.

In this case, the first system and the second system can each comprise a system which provides multimedia services via a suitable network infrastructure, for example a fixed network, a mobile radio network, a terrestrial and/or a satellite-based distribution network, a communication network or a hybrid network with at least one of the aforementioned networks. In addition to the provision and/or the control of the provision of a program range, the first and the second system can at the same time also perform the provision of the first and the second program information, respectively. However, it is likewise possible for the first and/or the second system to be systems for purely providing program information, which are separate from the distribution and control functions.

The provision of the first and/or the second program information can be provision on request, in particular also by the at least one first terminal or by the second system. However the provision can likewise be effected in each case without request, that is to say in unsolicited fashion upon availability, upon partial or complete presence of program information to be provided or upon occurrence of an event, e.g. a time condition, a load condition of a network component or a load and/or availability state of a network. Such a condition can be, in particular, the reaching of a point in time, availability again of a network component or of a terminal, the switching on of a terminal or the relief of an overload state in a network or in a network component.

A mixed provision without and with request can also be effected randomly or according to defined, e.g. flexibly changeable criteria. In the course of the provision, a transmission of the first and/or of the second program information or of parts thereof can be effected. Such a transmission can be followed by reception and processing and thus supply with the first and/or the second program information.

The first and the second program information can comprise in each case information visible to the subscriber, e.g. the user of a first and/or second terminal.

One development is for the first program information and the second program information in each case to comprise information not intended for display.

In this case, information not visible to the user comprises, for example, the identification and/or access information necessary for providing a content selected from the program information. It is also possible that combinations with contents which are outside or do not belong to the first and/or second program information are not displayed.

Furthermore, the first program information and the second program information can comprise at least one of the following items of information:
a channel identification number;
a channel number;
a channel address;
a channel name;
a program name;
a name of a video/audio category;
rating information;
youth protection information;
a start time;
an end time;
a time duration;
a length indication;
a memory space requirement;
a duration of availability;
cost information;
use information;
use limitation information;
a brief description;
a link to a content on the Internet;
a link to a content stored on a web server;
a pictorial representation, in particular a sequence of pictorial representations;
a sequence of frames concerning an audiovisual or multimedia content;
a preview;
an excerpt from an audiovisual or multimedia content;
a sequence of excerpts from an audiovisual or multimedia content;
quality information;
coding information;
a unicast or a multicast address;
frequency information;
a transmission parameter;
information concerning a transmission partner;
information concerning provision of an audiovisual or multimedia content in particular via streaming, download or a combination of streaming and download.

The first and the second program information can in each case concern television or radio programs, in particular, which are displayed e.g. horizontally and/or vertically with channel number and channel name. In the same way, with the capability of being called up on request by an individual subscriber, multimedia contents, feature films, video clips, recordings and live recordings, audio contents, ordered linearly, in a directory structure, in levels and/or according to subjects, can be part of the program information. Internet pages or walled garden pages can also be part of the first and second program information. An entry in the program information can be enriched with image material or image and sound material. In particular, a still image, a moving image or current live signal of a channel, or in each case a link or a reference to such information or a combination with such information can be part of the first and/or the second program information. In particular, the first program information or the second program information can in each case be an electronic program guide (EPG).

In accordance with another feature of the invention, the second program information is provided to at least one further terminal, the second system comprising the at least one further terminal.

It is thereby advantageous that the further terminal can acquire the second program information directly and in a manner such that the provision functionality of the second system is bypassed and not used. For the further terminal, this affords the freedom that the further terminal need not necessarily be a terminal in a specific system for providing multimedia services and/or that it does not have to obtain the second program information, if appropriate, from a system—assigned to the aforesaid system—for providing second program information. A subscriber with access to the at least one further terminal can freely choose a multimedia service provider. It is likewise possible for a terminal to be either in the role of a second terminal or in the role of a further terminal, thereby affording the advantage of particularly high availability of the second program information even in the case of faults and load states.

In particular, one development is for a second identifier to be provided by the at least one further terminal.

This is associated with the advantage that authentication is possible on the basis of the second identifier, said authentication making it possible to prevent or suppress unauthorized provision of the second program information. The second identifier can be used either for identifying a subscriber at the at least one further terminal or for identifying the at least one further terminal.

The provision and/or transmission of the second identifier can be effected before or with, during or in the context of the provision of the second program information.

The second identifier can advantageously also be identical with an identifier already present for other reasons. Thus, by way of example, in the case of terminals of a mobile radio network, the call number of a subscriber MSISDN (Mobile Subscriber Integrated Digital Services Network Number) can be used as a second identifier.

Moreover, one development is for the second program information to be provided on the basis of the second identifier.

In this case, it is advantageous, for example, that a second program information can be specifically provided to the at least one further terminal. The at least one further terminal can thereby acquire second program information which is adapted to its requirements and which becomes accessible automatically upon availability of first program information. Two different further terminals can acquire individual versions of the second program information. These versions can deviate, if appropriate, from the version of the second program information which is acquired by the at least one function of the second system for providing the second program information.

Furthermore, one development is for the second program information to be determined by means of specific rules for the at least one further terminal, wherein the specific rules are in particular predefined, configured and/or defined, generated, erased or altered by means of message exchange with the at least one further terminal.

This affords the advantage that the second program information can be adapted both to the requirements of the at least one further terminal and/or to those of the user of the at least one further terminal. Thus, by way of example, items of information which are not of interest to the user can be masked out in the second program information. Moreover, a large number of items of information in the form of the second program information can be present which permit a clear output on the display device of the terminal type of the at least one further terminal.

In particular, it is advantageous that the rules of determining the second program information can be determined or defined by intercommunication with the at least one further terminal. Thus, a subscriber at the at least one further terminal may be interested for example only in individually favored program channels and video categories. In the case of interest being changed, a communication of the at least one further terminal concerning a change can be used so as to be provided in future with further or other items of information in the form of the second program information. Provision of the second program information in a manner taking account of such a change can be effected directly or in a manner shifted temporally, e.g. upon a defined event being present, after such a communication.

In accordance with an additional development, a first message of the at least one further terminal is received;

a first information element of the second program information is marked on account of the receipt of the first message;

the first information element is associated with a first content element;

the first content element is associated with a point in time;

a second message is transmitted to the at least one further terminal upon the point in time being reached or upon the point in time being approached.

This affords the advantage that a subscriber, in the context of the second program information provided to the at least one further terminal, can define a content of particular individual relevance which is tied to a point in time and about which said subscriber is reminded in a timely manner. In this case, it is possible for the subscriber to be informed at the beginning of the availability of the content, or if appropriate long enough beforehand, by means of a reminding second message to the at least one further terminal.

It is thus possible for a subscriber to receive such a second message for example via said subscriber's mobile radio device, that is to say mobile telephone, at the beginning of a transmission of a sports event that is of interest to said subscriber, which said subscriber can then follow on the latter's mobile terminal or a non-mobile terminal.

The second message can be any message which can be transmitted to the further terminal, in which case the second message can comprise for example in particular an SMS message, an MMS message, an audio or video call, a ringtone, an output on a display, an announcement, a video message, a video clip or an instant message.

The first information element of the second program information can typically be a representation or a descriptive representation of the first content element.

First content elements can in this case be for example a television broadcast, a radio broadcast, a multimedia content available by means of a point-to-multipoint connection and/or upon request, in particular an audiovisual content, a video-on-demand (VoD) content, a video clip, an image recording, a sound recording and/or a content accessible via Internet protocol.

The first information element can be in particular an element of a channel-based content representation of the second program information, to which element, by way of example, a start time and an end time and also, if appropriate, a title are assigned. The first information element can likewise comprise an information page describing a television broadcast or radio broadcast, or a plurality of such pages.

In this case, a marking of the first information element can be visible to the subscriber in the second program information on the basis of which said marking is performed. The marking can likewise be altered and erased by the user. During the determination of the second program information, the marking can automatically extend to further first information elements of the second program information which relate to the same first content element.

A simultaneously present marking of a plurality of information elements which are associated with different content elements is likewise possible. If the second program information comprises a plurality of related first information elements, the relatedness of which results from the association with related first content elements, a marking of a plurality of first information elements can be effected just with a single first message. In this case, for each of the related first content elements, in each case at least one first information element associated with it can be marked. This affords the advantage that, by way of example, all parts of a television series that are contained in the second program information can be marked by means of a single first message or on the basis of a single operating action by the user that leads to the provision of said first message. Such markings can be maintained when the second program information is updated, or are automatically extended to series elements of a subsequent time period possibly contained in the updating. The latter functionality can be part of the determining of the second program information.

Finally, a notification by means of a second message can likewise be effected after a defined overshooting of the point in time associated with the first content element. A notification is thus also possible upon the point in time being overshot e.g. by a certain period of time. This is advantageous, for example, if the user is only interested in a certain part of the program, for instance in a second half of a football match.

In accordance with a further development of the invention, a first identifier is provided to the first system by the at least one first terminal.

This has the advantage, inter alia, that authentication is possible on the basis of the first identifier, said authentication making it possible to prevent or suppress an unauthorized provision of the first program information. The first identifier can be used either for identifying a subscriber at the at least one first terminal or for identifying the at least one first terminal. The same applies to the provision of the first program information for devices that differ from first terminals. The provision and/or transmission of the first identifier can be effected before or with, during or in the context of the provision of the first program information. By way of example, the MAC address (Media Access Control Address) of a terminal suitable for IPTV can serve as first identifier. As an alternative or in addition, a password can be used for identification.

One configuration is for the first program information to be provided on the basis of the first identifier.

Consequently, first program information can be specifically provided to the at least one first terminal. The at least one first terminal can acquire first program information which is adapted to its requirements and which becomes accessible with the provision of the first program information. Two different first terminals can acquire individual versions of the first program information.

One advantage also consists in the fact that first program information can be specifically provided to devices which differ from first terminals and to which the first program information is provided, in particular in the same way.

With regard to the second identifier mentioned above, there is likewise the possibility of an assignment between a first identifier and a second identifier, and the possibility of an assignment of a first identifier and a plurality of second identifiers. Advantageously, therefore, with regard to the determination of the second program information, the provision of particularly suitable first program information can already be accessed. The particularly suitable first program information can facilitate and/or simplify the determination of the second program information respectively desired.

An alternative embodiment consists in the fact that the second program information is determined by at least one second information element of the second program information being determined, wherein the at least one second information element is associated with a second content element, wherein the second content element is associated with the first program information.

This has an advantage in that the second program information comprises a second information element which is associated with a second content element which, for its part, is associated with the first program information. The first program information thus advantageously contains items of information that are linked to the second content element. These items of information can be found in a simple manner on account of the linkage and be used for determining the second information element.

If the linkage of the second content element to the first program information is accompanied by the fact that the first program information contains information describing the second content element, this information can then be evaluated by determining the second information element. If that is not the case, then further information is required for the determination of the second information element, e.g. from sources specified by means of an operator action or on the basis of operator inputs themselves.

With regard to the description of the properties of the second content element and the second information element, the statements made above for the first content element and the first information element, respectively, are applicable.

In a further configuration,
the first program information has a third information element;
the third information element is associated with a third content element;
the second program information has a fourth information element;
the fourth information element is determined on the basis of the third information element.

It is thereby advantageous that the second program information comprises a fourth information element, which can be determined from a third information element of the first program information, the third information element relating to a third content element.

In other words, by way of example, information which is present with regard to a television broadcast and which is contained in the first program information is used for creating the fourth information element of the second program information. By way of example, the descriptive information present for a program or for a series in the first program information can be evaluated and/or adapted for the determination of a fourth information element for an episode of the series in the second program information.

Moreover, one configuration involves the fourth information element being associated with the third content element.

In this case, it is advantageous that the second program information comprises a fourth information element, which can be determined in a simple manner from the third information element of the first program information, it being possible for the third and the fourth information element to relate to an identical third content element.

If the first program information contains, in the form of the third information element, for example, descriptive information for a television program or for a feature film available on individual request as third content element, then it is possible to generate from the third information element a fourth information element as part of the second program information for the second system or for second and further terminals. The fourth information element thus comprises descriptive information which is suitable for the second system and further terminals and which may concern precisely said television program or precisely said feature film available on individual request.

With regard to the description of the properties of the third content element and the third and fourth information elements, the statements made above for the first content element and the first information element, respectively, are applicable.

The above developments are correspondingly applicable and possible in particular also for a plurality of second and third information elements, for a plurality of second and third content elements associated therewith, and/or for a plurality of fourth information elements.

In accordance with an advantageous development:
the first program information has a first attribute,
the second program information has a second attribute,
the second attribute is determined on the basis of the first attribute.

First and second attributes of the first and second program information, respectively, can be in this case in particular parts of the first program information and of the second program information, respectively. The first attribute and/or the second attribute can in each case have relevance beyond a single content element. This affords the advantage that parts of the program information which can be characterized as attribute can also be included automatically, in particular without operator intervention, in the determination of the second program information.

An additional configuration is for the first and the second attribute to comprise in each case one of the following components:
channel information
a channel name
a channel number
category information
a category name.

In this case, in particular, identical channel number and identical category name for specific channels and categories, respectively, are advantageous from the user's point of view.

Thus, the first attribute can comprise for example a first channel number, a first channel name and first channel information. With selection of the first channel number, the at least one first terminal of a user or subscriber, with the aid of the first system or a distribution system associated with said system, with the first channel information being employed, acquires access to a specific program channel bearing the first channel name.

If the second attribute then for example likewise comprises a second channel number, a second channel name and second channel information and if the second channel number is determined as a number identical with the first channel number, if the second channel name is determined as a channel name identical with the first channel name, and if the second channel information is determined such that the at least one second or the at least one further terminal of the user or subscriber has access to the specific program channel, then the user or subscriber can find and/or switch on the specific program channel with the same channel number and under the same channel name. This is advantageously possible both by means of the at least one first terminal and by means of the at least one second or the at least one further terminal.

The first channel information and the second channel information can be in particular in each case a multicast address, a frequency transition or any other form of access information which can enable access to a program channel for the respective terminal of the subscriber.

Another configuration is for the first program information to be provided by means of at least one third message, wherein the third message is configured in accordance with a communication between the first system and the at least one first terminal.

It is thereby advantageous that the first system, with regard to the determination of the second program information, can provide the first program information by means of a third message, which it also uses for providing the first program information for first terminals.

In particular, the first system can for this purpose advantageously use exclusively identical messages and message sequences such as are provided for first terminals. This results in a terminal-identical provision of the first program information, as a result of which support of a specific form of provision is not required. Consequently, no adaptations of the first system of the approach described herein are necessary.

Moreover, one possibility is for the second program information to be determined on the basis of transformation rules.

In this case, the transformation rules can be provided and/or altered in various ways. By way of example, the transformation rules can be transmitted as rules or in the form of parameters. Moreover, changes with respect to previous transformation rules can be transmitted. As an alternative, the transformation rules can be configured, e.g. created, altered and/or erased, by an operator. A configuration of this type can be carried out e.g. via a special communication channel or locally (e.g. on site) at a data processing system suitable for implementing the sequence of the method.

Moreover, a further configuration is for the first program information (FEPG) to be provided by means of HTTP, by means of XML, or by means of HTTP and XML.

In accordance with yet another configuration the second program information is provided by means of SOAP (Simple Object Access Protocol).

The use of the protocols mentioned above is advantageous with regard to the wide usability of the approach described here.

Moreover, one development is for the first program information to be provided to a gateway and to the at least one terminal by the first system.

The gateway is a component of the network, for example, in particular a multimedia gateway. By means of suitable network interfaces, for example, the gateway is in communication relations with the first system and the second system, and also, if appropriate, with the at least one further terminal. A communication between the gateway and the at least one further terminal can be effected for example directly or via the second system. With respect to a first terminal, the advantage of an increased processing power is afforded, in particular, on the basis of the gateway.

The object mentioned above is likewise achieved by a device for data processing comprising a processor unit and/or an at least partly hardwired circuit arrangement, which is designed in such a way that one of the methods mentioned above can be carried out.

Furthermore, for achieving the object, a system, in particular a communication system, is specified, comprising a device as described herein.

Other features which are considered as characteristic for the invention are set forth in the appended claims.

Although the invention is illustrated and described herein as embodied in a method and device for data processing, and system comprising the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
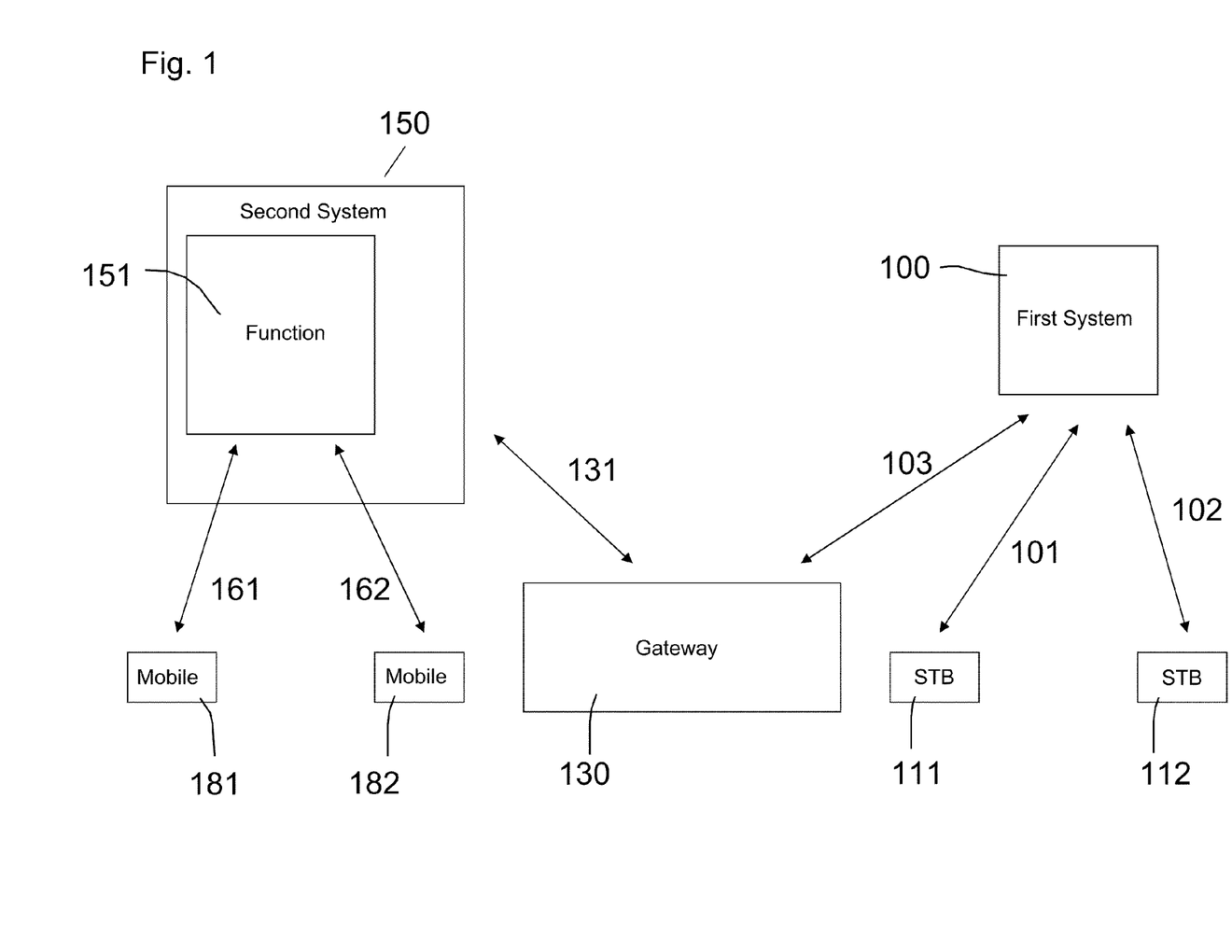
FIG. 1 shows a configuration with a first system, a second system and a gateway.

Referring now to the figures of the drawing in detail and first, particularly, to FIG. 1 thereof, there is shown a configuration for providing program information for terminals with a first system 100, a second system 150, and a gateway 130. The first system 100 comprises a plurality of servers for example, and is linked to a packet-based fixed network, via which it can communicate in particular both with IP-based first terminals of the fixed network, e.g. set-top boxes 111, 112, and with the gateway 130. The first system 100 is supplied with a first or a new version of an EPG via an operator or network interface. This version is intended to be made available as first program information at a point in time defined by an operator of the first system 100.

The first program information is present, for example in the form of a plurality of files suitable for being processed by the set-top boxes 111, 112. In order to provide the first program information for the set-top boxes 111, 112, the system 100 uses a two-stage method, for example, according to which, at a point in time determined by the operator of the first system 100, availability information is provided by multicast for the set-top boxes 111, 112. This availability information contains the information that first program information is ready. In addition, the availability information can contain a version and/or access information necessary for accessing the first program information. The access information is in turn a multicast address, for example, at which the set-top boxes 111, 112 can acquire the first program information. The set-top boxes 111, 112 can thus be loaded with the first program information by means of the access information in a multicast mode.

For fault situations and/or for a start-up or start of the set-top box 111, 112 at a point in time after the provision of the first program information, as an alternative to the path mentioned, in the first system 100, it is likewise possible for the first program information to be loaded in a unicast mode in a manner initiated on an individual request of the set-top box 111, 112 and, for instance, by means of HTTP.

In the same way, parts of the first program information can also be loaded into the set-top boxes 111, 112 in the multicast mode and/or in the unicast mode. For this purpose, e.g. a file that is part of the first program information can be provided to the system 100 via the operator or the non-illustrated network interface. Further availability information can then be provided by multicast for the set-top boxes 111, 112. On the basis of the further availability information, the set-top boxes 111, 112 acquire knowledge that the file is available. By means of further access information, which can be e.g. part of the further availability information, the set-top boxes 111, 112 can be loaded with the file by the system 100.

The first system 100 provides the first program information to the set-top box 111 via a communication relationship 101 and to the set-top box 112 via a communication relationship 102. The set-top boxes 111, 112 preferably each have software for access to services of a fixed network television, the software making it possible, in particular, for the set-top boxes 111, 112 to be able to communicate with the first system 100.

In order to avoid unauthorized access to the first program information, the MAC addresses of the set-top boxes 111, 112 are known in the first system 100. The MAC address is checked for example before the set-top box 111, 112 can access the availability information and/or the access information and/or the multicast address mentioned above. The MAC address is checked e.g. likewise before the first program information is individually loaded into the set-top box 111, 112 in a manner requested in unicast.

The first system 100 also makes available, in addition to the first program information, control functions of a digital TV solution based on the first program information. For this purpose, the first system 100 has a management of subscriber data and contents, and also, inter alia, interfaces to TV streaming servers, to VoD servers, to personal video recorder functions and/or to encryption functions.

The gateway 130 receives the first program information from the first system 100. In order that the gateway 130 can receive the first program information near-instantaneously, the gateway 130 eavesdrops permanently or cyclically recurrently at the same multicast address as the set-top boxes 111, 112 in order to acquire the availability information for the first program information. As an alternative, the gateway 130 can also cyclically recurrently interrogate the availability information for the first program information at the first system 100. In a manner comparable to a set-top box 111, 112, however, the gateway 130 can also demand the provision of the first program information. In this case, the gateway 130 preferably uses messages and/or message sequences comparable to a set-top box 111, 112. The first system 100 provides the first program information to the gateway 130 via a communication relationship 103. For identification at the first system 100, the gateway 130 uses a dedicated MAC address or one of the dedicated MAC addresses or, if appropriate, the MSISDN of a further terminal.

The first system 100 is prepared to provide the first program information for the gateway 130 by virtue of the dedicated MAC address of the gateway 130 or the one of the dedicated MAC addresses of the gateway 130 being stored in the first system 100. This can be done for example by setting up a virtual set-top box at the first system 100, which has the dedicated MAC address of the gateway 130 or the one of the dedicated MAC addresses of the gateway 130. No adaptation of the functionality of the first system 100 is necessary for this purpose.

The further terminal can also be introduced as a further virtual set-top box of the first system 100. This can be done for example by setting up the further virtual set-top box in the first system 100 in such a way that the MAC address of the further virtual set-top box is defined as the MSISDN of the further terminal. In addition, a dedicated set-top box type for the virtual set-top box or the further virtual set-top box can be introduced in the first system 100, which is advantageous with regard to simple handling by the operator of the first system 100.

With regard to simple routing, an IP address of the gateway 130 can be permanently stored in the first system 100. Moreover, the set-top box 111, 112 and the further terminal, in the first system 100, can be administratively assigned to a single subscriber.

The gateway 130 determines second program information after receipt of the first program information for example by carrying out a suitable conversion of the first program information, and provides the second program information to the second system 150 by means of suitable communication e.g. on the basis of a SOAP or an FTP. In this case, a transmission of the second program information from the gateway 130 to the second system 150 can be initiated by the gateway 130 or be effected upon request by the second system 150. The gateway 130 provides the second program information to the second system 150 via a communication relationship 131.

The second system 150 can comprise a plurality of servers and provide a solution for mobile television. It thus makes available, in particular, second program information, for instance, in the form of an EPG for second terminals, in particular for mobile terminals 181, 182.

Furthermore, the second system 150 can comprise servers for contents, for streaming and coding. The second system 150 contains a function 151 for providing the second program information for the mobile terminals 181, 182. An EPG suitable for the mobile terminals 181, 182 is present in the form of the second program information. The mobile terminals 181, 182 request the second program information or parts thereof from the function 151 as required and receive the desired information. The function 151 provides the second program information or parts thereof to the mobile terminal 181 via a communication relationship 161 and to the mobile terminal 182 via a communication relationship 162.

The mobile terminals 181, 182 can receive the second program information for example by MBMS, if available, or by HTTP upon request. The mobile terminals 181, 182 each have software for access to services of mobile television.

Figure 2:
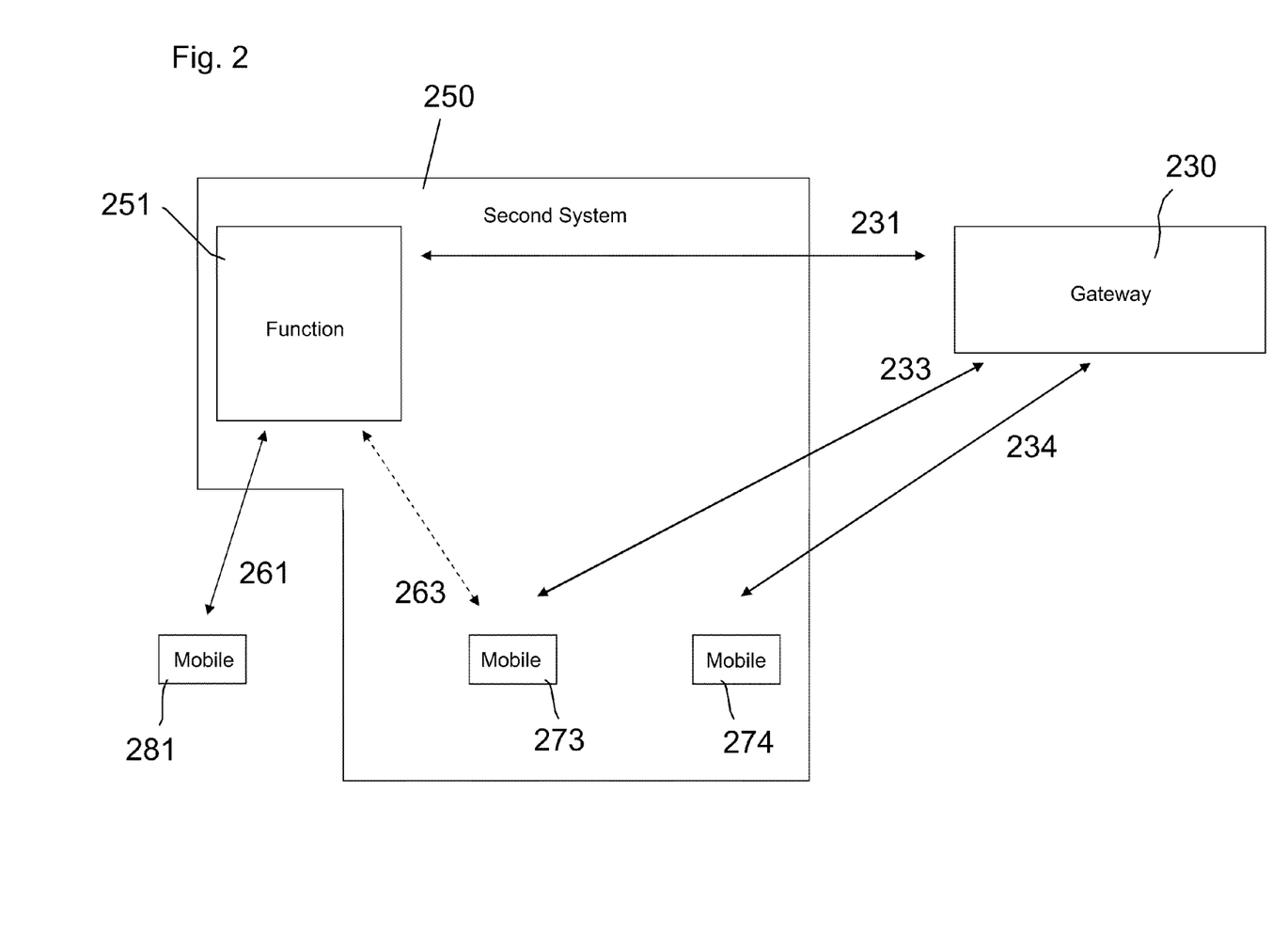
FIG. 2 shows a configuration with at least one further terminal.

FIG. 2 shows a configuration with at least one further terminal 273, 274. Here a second system 250 comprises a function 251 for providing an EPG suitable for mobile terminals for a second terminal 281, which is a mobile terminal. The function 251 provides the EPG suitable for mobile terminals to the second terminal 281 via a communication relationship 261. In addition to the function 251, the second system 250 comprises the further terminals 273, 274, which are likewise mobile terminals. The latter receive second program information directly from the gateway 230. The gateway 230 provides the second program information to the further terminal 273 via a communication relationship 233 and to the further terminal 274 via a communication relationship 234. The gateway 230 likewise supplies the function 251 with the second program information, which is done via a communication relationship 231.

The further terminal 273 can additionally also receive the EPG suitable for mobile terminals from the function 251. The function 251 provides the EPG suitable for mobile terminals to the further terminal 273 via a communication relationship 263. The EPG suitable for mobile terminals and accessible via the function 251 can differ from the second program information provided to or requested by the terminal 273 from the gateway 230. On the one hand, the second program information can be processed by the function 251; on the other hand, the second program information delivered via the communication relationship 233 can be specific to the further terminal 273. The further terminal 273 can simultaneously attain, request and/or process in particular both the program information made available by the function 251 and the program information made available by the gateway 230.

Figure 3:
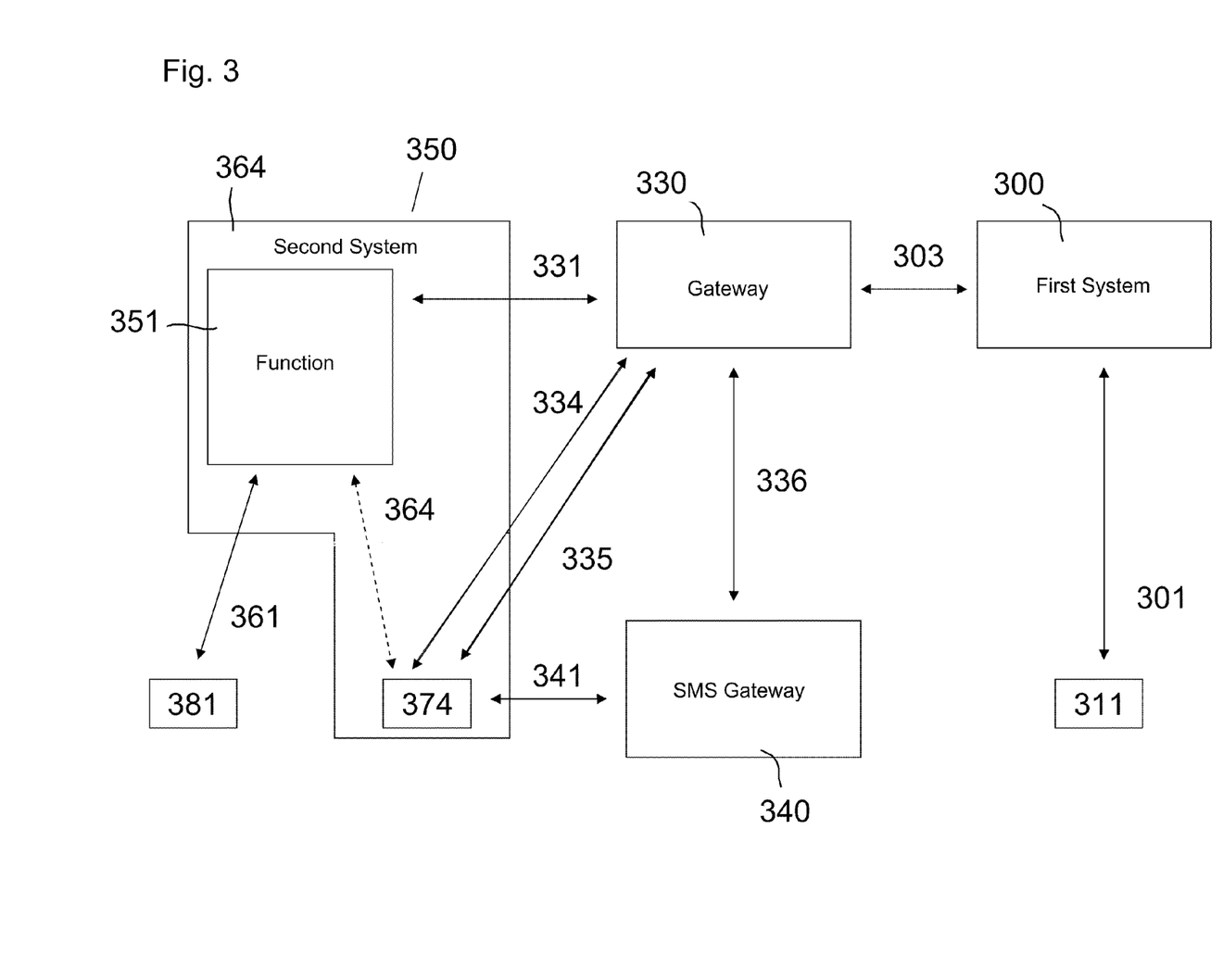
FIG. 3 shows a notification of an at least one further terminal by means of an SMS message.

FIG. 3 shows a notification of an at least one further terminal 374 by means of an SMS message 341. In the preliminary stage of this notification, a first system 300 makes first program information available to a first terminal 311 and to a gateway 330. The first system 300 provides the first program information to the first terminal 311 via a communication relationship 301 and to the gateway 330 via a communication relationship 303. After second program information has been determined in the gateway 330, it is made available to a function 351 and to the further terminal 374 of the second system 350. The gateway 330 provides the second program information to the function 351 via a communication relationship 331 and to the further terminal 374 via a communication relationship 334. The function 351 provides the second program information in the form of an EPG suitable for a second terminal 381. The function 351 provides the second program information to the second terminal 381 via a communication relationship 361. After access to EPG information available at the further terminal 374, the subscriber wishes to be notified of the beginning of an announced television broadcast in a timely manner. For this purpose, said subscriber chooses the television broadcast in the EPG and marks it by means of a suitable operating action, e.g. pressing an operating key on the further terminal 374. A successful marking leads to an identification of the television broadcast in the EPG and this is visible on the further terminal 374. It is possible, if this is not defined by a preset or as standard, for the subscriber to define a point in time of notification before the beginning of the broadcast. Thus, said subscriber can set, for example, notification one hour, 15 minutes or 30 seconds before the beginning of the desired television broadcast.

The selection made by the subscriber is transmitted from the further terminal 374 to the gateway 330 via a communication relationship 335. As an alternative, the selection made by the subscriber can be transmitted from the further terminal 374 to the gateway 330 via a communication relationship 364 and the communication relationship 331. If the first system 300 has a functionality for notifying the gateway 330 before the beginning of the announced television broadcast, then this functionality can be used by means of the gateway 330 transmitting the selection made by the subscriber to the first system 300 via the communication relationship 303 and the first system 300 informing the gateway 330, via the communication relationship 303, of the fact that the point in time has been reached. When the point in time has been reached, the gateway 330 initiates a reminder by means of the gateway 330 sending to an SMS gateway 340 a job for generating an SMS of a content determined by the gateway 330. The gateway 330 sends the job for generating the SMS to the SMS gateway 340 via a communication relationship 336. Upon receipt of the job for generating the SMS, the SMS gateway 340 generates the SMS and sends it. The SMS thereupon arrives at the further terminal 374 via a communication relationship 341. The content of the SMS is an indication concerning the television broadcast that is about to begin. In particular, the SMS can contain a channel number, a start time, and/or a program name.

Any notification job, once it has been generated, can also be changed or erased by means of the communication relationship 335. As an alternative, a notification job, once it has been generated, can also be changed or erased by means of the communication relationships 364 and 331. Notification jobs can also be generated either for individual episodes of a television series or for all episodes of a television series, that is to say the complete television series. Should a change in the second program information determined, in the context of e.g. weekly updating of the program information, clash with a notification job, once it has been created, then the gateway 330 can send corresponding information to the further terminal 374. This can be done using the communication relationship 334 in the context of the second program information or by SMS via the communication relationships 336 and 341. Thus, in particular, an SMS notification can be effected if the start time of the desired broadcast has shifted or the broadcast has been canceled.

Figure 4:
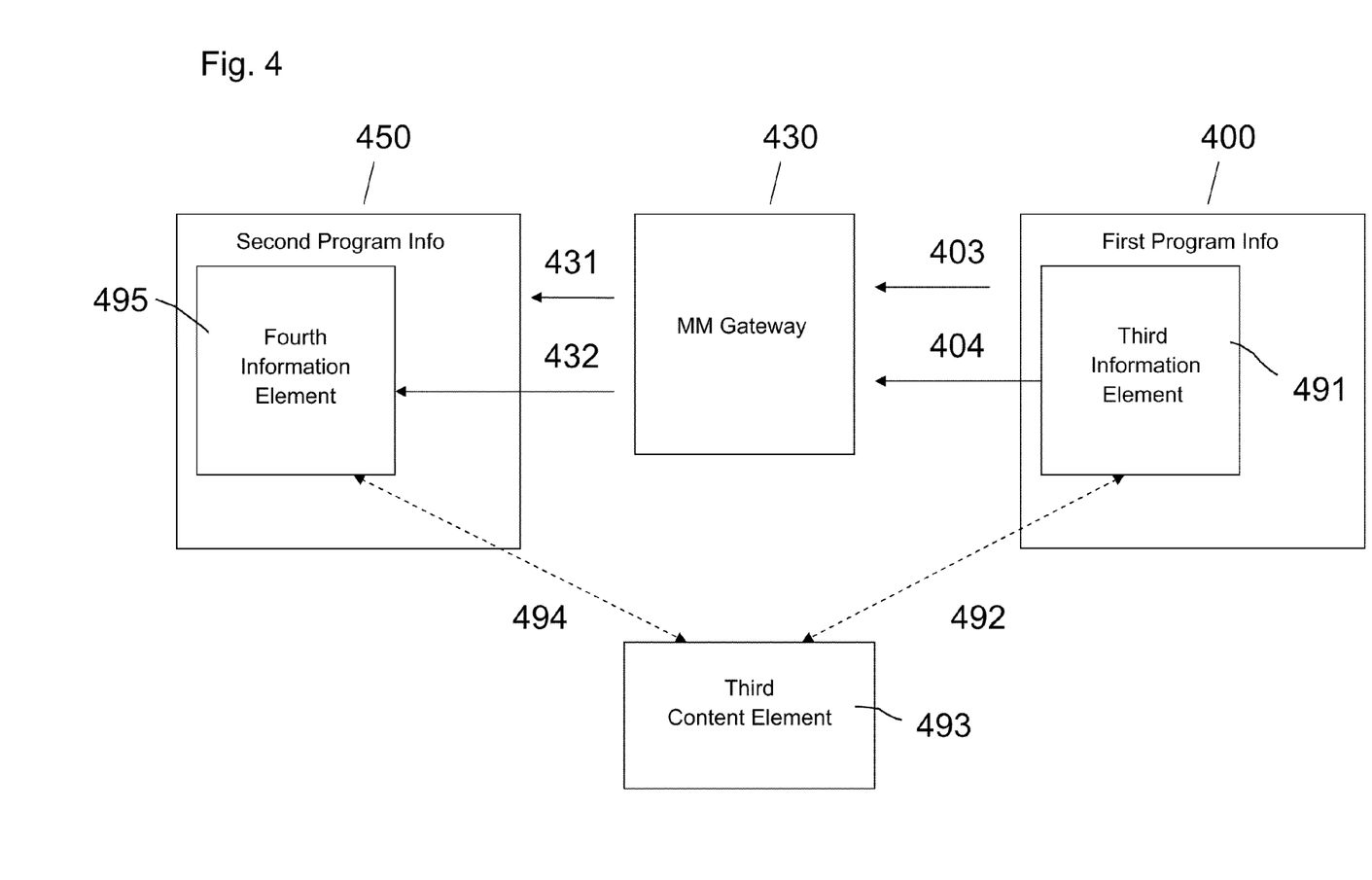
FIG. 4 shows a transformation of a third information element into a fourth information element.

FIG. 4 shows a transformation of a third information element 491 into a fourth information element 495, the third information element 491 and the fourth information element 495 being associated with a third content element 493.

In this case, first program information 400 comprises the third information element 491, which is linked to the third content element 493 or defined by the latter. The linkage of the third information element 491 to the third content element 493 is represented by the relationship 492. The third content element 493 can be for example a digital content of the feature film "Gone With The Wind." The third information element 491 then typically also contains, in addition to the title "Gone With The Wind" and the broadcast data (e.g. a channel y, a time of day z), descriptive portions, e.g. a synopsis, a cast list, information about the origination history, current information, exemplary image or video material and/or associated access information.

The first program information 400 is made available to a multimedia gateway 430 via a communication relationship 403. The multimedia gateway 430 determines second program information 450 and provides the latter via a communication relationship 431. In this case, configuration information is available to the multimedia gateway 430 for the channel y, according to which configuration information it is determined, for example, that all broadcasts of the channel y must also be generated in the second program information 450 since this channel is offered to mobile terminals of a mobile television for which the second program information 400 is intended to be created. On the basis of the third information element 491 and the configuration information, the multimedia gateway 430 creates the second program information 450 in such a way that the second program information 450 comprises the fourth information element 495. The fourth information element 495 emerges from the information element 491, for example by virtue of the fact that only the first three sentences/lines of the synopsis are accepted into the fourth information element 495 and possibly contained image and video material or corresponding linkages are erased. This determination of the second program information 450 using the information element structure and certain transformation stipulations is represented by the relationships 404 and 432. The resulting fourth information element 495 is in turn associated with the feature film "Gone With The Wind," that is to say the third content element 493, which is represented by the relationship 494.

Figure 5:
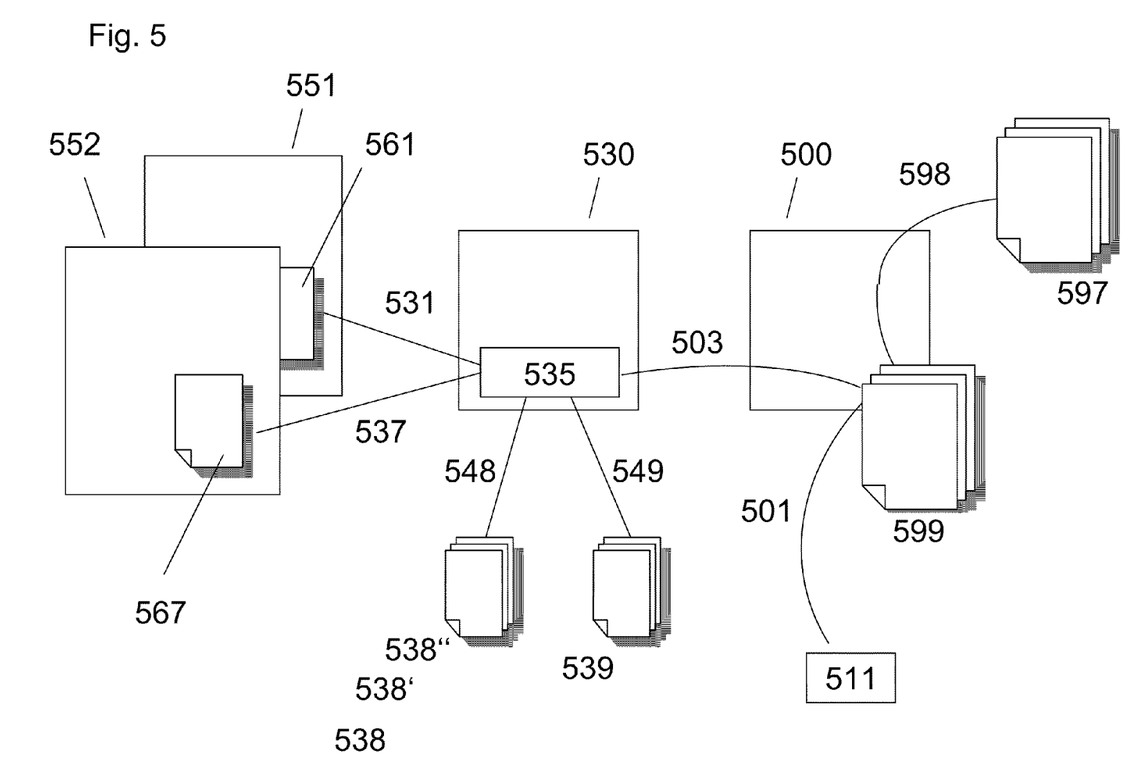
FIG. 5 shows a flow of first and second program information to at least one set-top box and to functions for providing the second program information.

FIG. 5 shows a flow of first and second program information to at least one set-top box 511 and to functions 561, 567 for providing the second program information.

In this case, EPG data 597 are made available to a first system 500. Said EPG data 597 comprise pure program information, for example, which has to be adapted to the requirements of the first system 500 and of the at least one set-top box 511. By way of example, the EPG data 597 can be present in the form of a channel table (x.chn), a program table (y.prg) and a broadcast table (z.sch). In this case, a table element of the channel table comprises a channel reference number for identifying a TV channel and also the name of the program channel displayed on the screen or display (e.g. channel 1, channel 2). A table element of the program table contains, inter alia, a program reference number, the title of a broadcast or the program name (e.g. channel 1 Now—The Weather), and descriptive information for the program or broadcast. A table element of the broadcast table comprises a channel reference number, a program reference number, and also the date and start time of a scheduled broadcast of the program designated by the program reference number on the channel designated by the channel reference number. In the form of the tables mentioned, the EPG data 597 are loaded into or made available to the first system 500 via a communication relationship 598.

The first system 500 generates first program information 599 from the EPG data 597 and configuration data of the system 500. The first program information 599 is generated in an XML format. In particular, an XML-based DTV channel table and an XML-based broadcast schedule can be created in this case.

The DTV channel table comprises for example version information, a channel list, a channel identification, a channel reference number, a channel type, a channel name (e.g. channel 3), an indication regarding suitability for HDTV contents, information regarding the definition (e.g. HDTV, SDTV), an IP address (e.g. multicast address), a port number, information regarding the association with a service package. The broadcast schedule comprises for example version information, a program description, channel information and an envisaged broadcast time.

The first program information 599 is provided in the form of the present XML files to the at least one set-top box 511 and also to a gateway 530. The system 500 provides the first program information 599 to the at least one set-top box 511 via a communication relationship 501 and to the gateway 530 via a communication relationship 503. The first program information can be program information provided for the first time or an updating of already existing program information. The transmission possibilities already disclosed in connection with FIG. 1 can be employed. A cyclic request by the gateway 530 directed to the first system 500 can likewise be effected in order to ascertain whether a new version of at least one of said XML files has become available in the meantime. If this is the case, then the gateway 530 can request the loading of the updated files from the system 500.

The gateway 530 has a transformation function 535. The latter has access to the first program information provided via the communication relationship 503. Furthermore, transformation rules 538, 538', 538" and local configuration data 539 are available for the transformation function 535 and can be made available to the gateway 530 for example by local input or via suitable interfaces to a communication network, this being represented by communication relationships 548 and 549. The configuration data 539 can comprise for example respectively at least one item of voice information, coding information for video (e.g. H.263), coding information for audio (e.g. AMR), price information, service identification, physical reference to a content. The transformation rules 538, 538', 538" are stored or described for example in the form of template and/or stylesheet files. A clear description which is readily adaptable for the operator is thus provided, the application of which permits a format required for any desired target system.

An application of the transformation rules 538 on the basis of the first program information and the configuration data 539 produces for example second program information 567 suitable for a second system 552, said second program information being provided to the second system 552 by means of the SOAP, for example. The information flow required for this purpose is represented by a communication relationship 537.

In addition to the second system 552, which enables mobile television, for example, a further system 551 can be provided, which provides for example a multimedia program range for PC-based terminals or a further IPTV-based program range for set-top boxes. The application of the transformation rules 538' on the basis of the first program information and the configuration data 539 produces for example second program information 561 suitable for the further system 551, said second program information being provided to the further system 551. The information flow required for this purpose is represented by a communication relationship 531.

In the same way, it is likewise possible to generate and provide a specific format of the second program information for the at least one further subscriber (not illustrated in FIG. 5) using the further transformation rules 538".

The respective second program information generated for a target system or a terminal can comprise in the respectively suitable target format per broadcast at least one program reference, a title, a start time and length information and/or end time information.

The foregoing text uses a variety of acronyms. These acronyms are listed in the following for ease of reading the specification.

AMR Adaptive Multirate
CGW Convergence Gateway
DSL Digital Subscriber Line
DTV Digital Television
DVB Digital Video Broadcasting
DVB-H Digital Video Broadcasting-Handheld
EPG Electronic Program Guide
FTP File Transfer Protocol
GW Gateway
HDTV High Definition Television
HTTP Hypertext Transfer Protocol
IP Internet Protocol
IPTV Internet Protocol Television
MAC Media Access Control
MBMS Multimedia Broadcast Multicast Service
MMS Multimedia Messaging Service
PC Personal Computer
PVR Personal Video Recorder
SDTV Standard Definition Television
SMS Short Messaging Service
SOAP Simple Object Access Protocol
STB Set-Top Box
TV Television
UMTS Universal Mobile Telecommunications System
VoD Video on Demand
XML Extensible Markup Language

The invention claimed is:

1. A data processing method, which comprises:
providing first program information with a first system, the first system being linked to a packet-based fixed network, via which it communicates with at least one first terminal and a gateway;
providing the first program information also for the at least one first terminal;
determining, by the gateway, second program information on a basis of the first program information;
providing, by the gateway, the second program information for a second system;
providing, with a function of the second system, the second program information for at least one second terminal, the at least one second terminal being a mobile terminal;
providing, by the gateway, the second program information to at least one further terminal, the second system including the at least one further terminal;
the at least one further terminal being a mobile terminal, and the at least one further terminal acquires the second program information in a manner such that the function of second system is bypassed.

2. The method according to claim 1, which comprises providing a second identifier with the at least one further terminal.

3. The method according to claim 1, which comprises determining the second program information by way of specific rules for the at least one further terminal.

4. The method according to claim 3, which comprises at least one of predefining, configuring, defining, generating, erasing, or altering the specific rules, and wherein the steps of defining, generating, erasing, and altering are by way of message exchange with the at least one further terminal.

5. The method according to claim 1, which comprises:
receiving a first message of the at least one further terminal;
marking a first information element of the second program information on account of receiving the first message;
associating the first information element with a first content element;
associating the first content element with a point in time; and
transmitting a second message to the at least one further terminal upon the point in time being reached or upon the point in time being approached.

6. The method according to claim 1, which comprises providing a first identifier to the first system by the at least one first terminal.

7. The method according to claim 1, wherein:
the step of determining the second program information comprises determining at least one second information element of the second program information;
wherein the at least one second information element is associated with a second content element; and
wherein the second content element is associated with the first program information.

8. The method according to claim 1, wherein:
the first program information has a third information element;
the third information element is associated with a third content element;
the second program information has a fourth information element; and
which comprises determining the fourth information element on a basis of the third information element.

9. The method according to claim 1, wherein the first program information has a first attribute and the second program information has a second attribute, and wherein the second attribute is determined on the basis of the first attribute.

10. The method according to claim 1, which comprises providing the first program information by way of at least one third message, wherein the third message is configured in accordance with a communication between the first system and the at least one first terminal.

11. The method according to claim 1, wherein the step of determining the second program information comprises determining the second program information on the basis of transformation rules.

12. The method according to claim 1, wherein the first program information is provided by way of HTTP, by way of XML, or by way of HTTP and XML.

13. The method according to claim 1, which comprises providing the first program information to a gateway and to the at least one terminal by the first system.

14. A system, including a first system, a second system, and a gateway with a processor unit and/or an at least partly hardwired circuit arrangement, the system configured to carry out a data processing method, comprising:
   providing first program information with the first system;
   providing the first program information also for at least one first terminal, the first system being linked to a packet-based fixed network, via which it communicates with the at least one first terminal and the gateway;
   determining, by the gateway, second program information on a basis of the first program information;
   providing, by the gateway, the second program information for a second system;
   providing, with a function of the second system, the second program information for at least one second terminal, the at least one second terminal being a mobile terminal;
   providing, by the gateway, the second program information to at least one further terminal, the second system including the at least one further terminal, the at least one further terminal being a mobile terminal; and the at least one further terminal acquires the second program information in a manner such that the function of the second system is bypassed.

15. The system according to claim 14 configured as a communication system.

* * * * *

UNITED STATES PATENT AND TRADEMARK OFFICE
CERTIFICATE OF CORRECTION

Page 1 of 1

PATENT NO. : 9,628,743 B2
APPLICATION NO. : 12/635142
DATED : April 18, 2017
INVENTOR(S) : Johannes Krupp It is certified that error appears in the above-identified patent and that said Letters Patent is hereby corrected as shown below:

On the Title Page (73) Assignee: should read, Nokia Solutions and Networks OY, Espoo (FI)

Signed and Sealed this
Fifth Day of September, 2017

Joseph Matal
*Performing the Functions and Duties of the*
*Under Secretary of Commerce for Intellectual Property and*
*Director of the United States Patent and Trademark Office*